US010578640B2

(12) United States Patent
Lefebvre (10) Patent No.: US 10,578,640 B2
(45) Date of Patent: Mar. 3, 2020

(54) DETERMINATION OF A MOBILITY CONTEXT FOR A USER CARRYING A DEVICE FITTED WITH INERTIAL SENSORS

(71) Applicant: Orange, Paris (FR)

(72) Inventor: Gregoire Lefebvre, Crolles (FR)

(73) Assignee: ORANGE, Paris (FR)

( * ) Notice: Subject to any disclaimer, the term of this patent is extended or adjusted under 35 U.S.C. 154(b) by 107 days.

(21) Appl. No.: 15/608,409

(22) Filed: May 30, 2017

(65) Prior Publication Data

US 2017/0343577 A1 Nov. 30, 2017

(30) Foreign Application Priority Data

May 30, 2016 (FR) ...................................... 16 54859

(51) Int. Cl.
| | | |
|---|---|---|
| *G01P 15/02* | (2013.01) | |
| *H04M 1/725* | (2006.01) | |
| *G06F 1/16* | (2006.01) | |
| *G06F 3/01* | (2006.01) | |
| *G06K 9/00* | (2006.01) | |
| *G06N 3/04* | (2006.01) | |

(52) U.S. Cl.
CPC ............ *G01P 15/02* (2013.01); *G06F 1/1694* (2013.01); *G06F 3/017* (2013.01); *G06K 9/00355* (2013.01); *H04M 1/72569* (2013.01); *G06N 3/0454* (2013.01)

(58) Field of Classification Search
CPC ........ G01P 15/02; G06F 1/1694; G06F 3/017; G06K 9/00335; G06K 9/0035; H04M 1/72569; H04M 1/7256; G06N 3/0454
See application file for complete search history.

(56) References Cited

U.S. PATENT DOCUMENTS

| | | | |
|---|---|---|---|
| 2009/0037849 A1 | 2/2009 | Immonen et al. | |
| 2014/0347265 A1* | 11/2014 | Aimone ................. | G09G 3/003 345/156 |
| 2015/0002389 A1 | 1/2015 | Lefebvre et al. | |
| 2015/0194145 A1* | 7/2015 | Chen ....................... | G06F 3/038 345/156 |
| 2016/0266386 A1* | 9/2016 | Scott ....................... | G06F 3/013 |

FOREIGN PATENT DOCUMENTS

EP 2821893 A2 1/2015

OTHER PUBLICATIONS

French Search Report dated Feb. 15, 2017 for corresponding French Application No. 1654859, filed May 30, 2016.

(Continued)

*Primary Examiner* — Bryan Bui
(74) *Attorney, Agent, or Firm* — David D. Brush; Westman, Champlin & Koehler, P.A.

(57) ABSTRACT

A method is provided for determining a mobility context for a user carrying a device fitted with inertial sensors. The method includes measuring inertial data from a set of inertial sensors of the device, taken at the time of execution of a reference gesture with the device, comparing the measured inertial data with prerecorded inertial data for various mobility contexts and for this reference gesture, and determining the mobility context according to the result of the comparison. A device and a server are also provided, which are capable of implementing the method described.

11 Claims, 6 Drawing Sheets

(56) References Cited

OTHER PUBLICATIONS

Taiwoo Park et al., "E-Gesture: A Collaborative Architecture for Energy-Efficient Gesture Recognition with Hand-Worn Sensor and Mobile Devices" Proceedings of the 9th ACM Conference on Embedded Networked Sensor Systems, Sensys ' 11, Nov. 1, 2011 (Nov. 1, 2011), pp. 260-273, XP055345254.
Jiahui Wu et al., "Gesture Recognition with 3 a 3-D Accelerometer" In: "Lecture Notes in Computer Science", Jul. 7, 2009 (Jul. 7, 2009), Springer Berlin Heidelberg, Berlin, Heidelberg, XP055142497.
English Translation of French Written Opinion dated Feb. 15, 2017 for corresponding French Application No. 1654859, filed May 30, 2016.
Bellman et al. "On the Approximation of Curves by Line Segments Using Dynamic Programming—II." United States Air Force Project Rand, Memorandum RM-2978-PR. Feb. 1962.
Bromley et al. "Signature Verification using a "Siamese" Time Delay Neural Network." NIPS Proc, American Telephone and Telegraph Company. 1994.

* cited by examiner

| | |
|---|---|
| Exp1 | 0.82 |
| Exp2 | 0.85 |
| Exp3 | 0.79 |
| Exp4 | 0.77 |
| Exp5 | 0.81 |
| Exp6 | 0.78 |
| Exp7 | 0.81 |
| Exp8 | 0.86 |
| Exp9 | 0.87 |
| Exp10 | 0.82 |
| Mean | 0.818 |
| Standard Deviation | 0.0335989 |

FIG. 7

DETERMINATION OF A MOBILITY CONTEXT FOR A USER CARRYING A DEVICE FITTED WITH INERTIAL SENSORS

CROSS-REFERENCE TO RELATED APPLICATIONS

This Application claims priority to and the benefit of French Patent Application No. FR1654859, filed May 30, 2016, the content of which is incorporated herein by reference in its entirety.

FIELD OF THE DISCLOSURE

The present disclosure relates to the field of inertial data measurements for a device fitted with inertial sensors following the execution of a gesture with this device. More particularly, the disclosure relates to the detection of a mobility context for a user carrying this type of device by analysis of such measurements.

BACKGROUND OF THE DISCLOSURE

Many services are offered today on devices of smartphone, smart watch, smart glasses, etc. type, using inertial sensors (accelerometer, gyrometer, magnetometer, etc.) capable of measuring various types of movement. The inertial data from these sensors are used, for example, to determine the execution of a gesture performed by a user with the device. Such a gesture can be performed in 2D, that is to say, for example, on a screen of the device by drawing or writing or in 3D by means of a gesture made in the air by the user carrying this device.

In general, these gestures are recognized by comparing the characteristics from physical measurements collected by the inertial sensors with those from predefined models.

However, on account of the mobile nature of the device, the user is caused to execute these gestures in different context situations and depending on a different mobility. These different mobility situations can impair the analysis of the inertial data that are measured and thereby the detection of the gestures that have been performed with the device.

For example, the action of shaking a mobile phone is recognized more or less if the user performing this gesture is at home, on a bus, in an elevator or in another environment. The analysis of the data may also be different depending on whether the mobility of the user is low or high, for example when he is walking, when he is running or when he is jumping.

The methods of the prior art use data from sensors different than the inertial sensors in order to determine the context that the user is in. For example, in the patent application US2009/0037849, temperature sensors, optical sensors, acoustic sensors and light sensors can be used to determine the context or more exactly the situation that the user is in, in relation to predefined situations. Many other systems use GPS data to determine a location and therefore a prerecorded context (at work, at home, etc.).

Finally, other systems use an interface to present the user with various contexts or situations to select from a predefined list, before implementing gesture detection on the device.

These systems require a multitude of sensors or measuring means that clutter up and complicate mobile devices.

They require a priori knowledge of a list of predefined contexts or situations that is not necessarily suited to all situations.

The selection of a context from a plurality of contexts is not easy for the user, who sometimes has difficulty in defining his context (is he moving slowly, quickly?), especially since his situation can change over the course of time.

There is therefore a need to be able to automatically detect a mobility context in a sufficiently precise manner with less complexity and limited measurements.

SUMMARY

An exemplary embodiment of the disclosure proposes a method for determining a mobility context for a user carrying a device fitted with inertial sensors. The method is such that it comprises the following steps:
  measurement of inertial data from a set of inertial sensors of the device, taken at the time of execution of a reference gesture with the device;
  comparison of the measured inertial data with prerecorded inertial data for various mobility contexts and for this reference gesture;
  determination of the mobility context according to the result of the comparison.

Thus, the execution of a reference gesture with the device makes it possible to obtain inertial data from inertial sensors that are then analyzed to determine a mobility context thanks to their mapping to recorded and learned inertial data for this very reference gesture.

Mobility context is understood to mean both the mobility context of the user, for example whether he is stationary, whether he is walking, whether he is running, or whether he is in action in general, and the movement context that surrounds him, such as, for example, the movement of the bicycle forwards or into curves, the movement of a boat, of a car, that is to say the situation in which he performs his action. Of course, the mobility context can also include an association of these two types of context, action and movement, such as, for example, when the user is walking on a moving bus or if he looks at his watch on a bicycle.

The execution of the reference gesture thus makes it possible to initiate the recognition system and to determine the context that the user is in. This knowledge of the mobility context can make it possible to adapt the services offered on the device or the interface to this mobility context. The execution of this gesture is generally simpler than a selection from a predefined context list, especially in fact when the user is moving. Moreover, the user does not have to think in order to know what context or what type of movement he is in the process of executing, as the method implemented does it for him.

The various particular embodiments mentioned below can be added independently or in combination with one another to the steps of the determination method defined above.

In a particular embodiment, the determination of the mobility context comprises the determination of a degree of mobility.

The method makes it possible to obtain a level of precision about the degree of mobility that the user may have. Specifically, various degrees of mobility, such as "not moving", "little movement", "moderate movement", "high level of movement", "extreme movement" can, for example, be defined and thus determined following the execution of the reference gesture.

This therefore makes it possible to bring a level of precision to the determination of the mobility context and therefore to use this precision to offer services suited to the user. Specifically, a mobility context in the "extreme movement" category, for example, can restrict him in his interaction options.

In a particular implementation, a fragmentation is applied to the measured inertial data in order to obtain a plurality of signals corresponding to various degrees of mobility to be detected.

This fragmentation makes it possible to obtain a plurality of signals that can be compared with multiple fragments or segments of various databases comprising data learned for various degrees of mobility.

In a particular embodiment, the determination of the mobility context is associated with a confidence measurement for the decision.

This confidence measurement makes it possible to define a threshold for which a degree of mobility decision can be taken. Thus, the decision about the mobility context is more reliable.

In an advantageous embodiment, the prerecorded inertial data are in a knowledge base fed by learning the reference gesture depending on various mobility contexts, and following the determination of the mobility context, the knowledge base is fed by the inertial measurements obtained for this determined mobility context.

The knowledge base that makes it possible to find the mobility context and the degree thereof is thus fed periodically and enriched in step with the measurements performed. It thus becomes more and more reliable and evolves to take into account new mobility data.

The present disclosure is also aimed at a device fitted with inertial sensors that is capable of determining a mobility context for a user carrying the device. The device is such that it comprises:
- a measurement collection module for inertial data from a set of inertial sensors of the device, taken at the time of execution of a reference gesture with the device;
- a module for comparing the measured inertial data with prerecorded inertial data for various mobility contexts and for this reference gesture;
- a decision module for determining the mobility context according to the result of the comparison.

The present disclosure is also aimed at a terminal comprising a device as described.

It is aimed at an apparatus capable of determining a mobility context for a user carrying a device fitted with inertial sensors. This apparatus is such that it comprises:
- a module for receiving measurements of inertial data from a set of inertial sensors of the device, taken at the time of execution of a reference gesture with the device;
- a module for comparing the measured and received inertial data with prerecorded inertial data for various mobility contexts and for this reference gesture;
- a decision module for determining the mobility context according to the result of the comparison.

This device, this terminal or the apparatus have the same advantages as the method described above, which they implement.

The disclosure is aimed at a computer program comprising code instructions for implementing the steps of the determination method as described when these instructions are executed by a processor.

Finally, the disclosure relates to a storage medium, which can be read by a processor, integrated or otherwise in the device or in the apparatus, possibly removable, on which a computer program comprising instructions for executing the steps of the method as described above is recorded.

BRIEF DESCRIPTION OF THE DRAWINGS

Other features and advantages of exemplary embodiments of the disclosure will become more clearly apparent on reading the description that follows, which is provided solely by way of non-limiting example, and given with reference to the appended drawings, in which.

DETAILED DESCRIPTION OF ILLUSTRATIVE EMBODIMENTS

Figure 1:
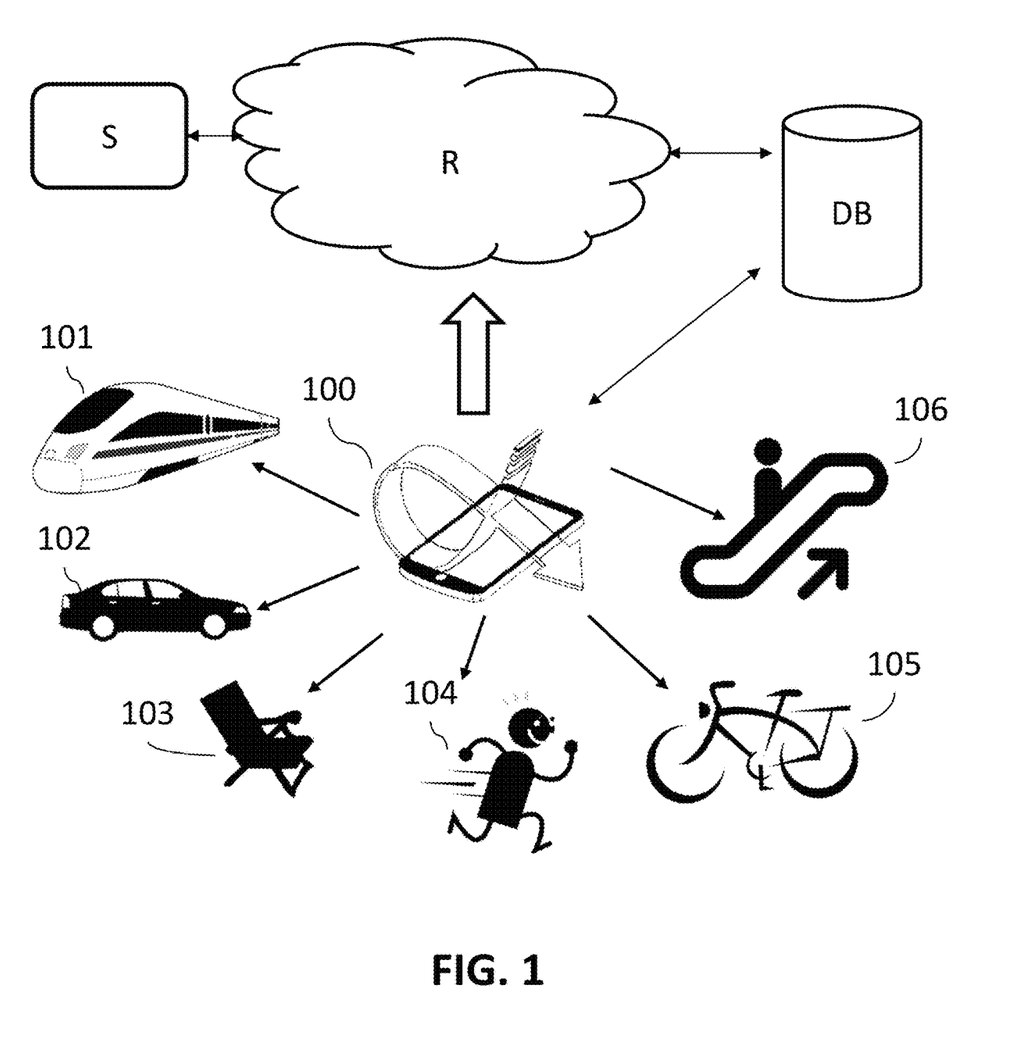
FIG. 1 illustrates an example of a system having a device and implementing the disclosure, according to one embodiment.

FIG. 1 schematically illustrates various situations that a user carrying a device 100, in this case illustrated by a mobile phone, may be in. The user carrying this phone performs a reference gesture with the device, for example a gesture with his terminal in his hand in the three-dimensional interaction space, the trajectory of which is similar to the infinity symbol, as illustrated in the figure.

Other gestures can be defined, for example drawing a heart or a letter, a geometric figure, etc. The terminal may not be in his hand and may, for example, be attached to the wrist of the user if it is a smart watch, or be situated on a smart object attached to a shoe, in which case the gesture is made with the foot.

The user can perform this gesture in different mobility situations. Specifically, he may be on a means of transport of train (101), automobile (102) or bicycle (105) type. He may himself be in walking or running (104) movement, on an escalator (106) or in any other mobility context, or a mobility context association, for example if he is walking on a train. He may of course be at rest and simply sitting (103). His mobility context can then be defined as being "not moving".

In the other situations given as an example above, the mobility context can change from "not moving" to "little movement", "moderate movement", "high level of movement", etc.

Various degrees can thus be associated with the mobility context, thus providing a different level of precision. Specifically, it is possible to categorize the mobility context into multiple categories. In a simple case, two categories can be defined: "not moving" and "moving". In the exemplary embodiment provided here, 5 categories are defined: "not moving", "little movement", "moving", "high level of movement" and "extreme movement". Of course, other degrees of mobility can be defined and other denominations can be associated with these categories.

In the configuration illustrated in FIG. 1, the terminal 100 communicates through a communication network R with a server S that can, in one embodiment, implement the analysis of the inertial data from sensors present on the terminal, which data are measured at the time of the execution of the reference gesture as described. The method implemented will be described in more detail with reference to FIG. 2.

The analysis of these inertial data is based on a comparison with other inertial data taken at the time of the execution of this very reference gesture and recorded in a database DB that may be available on the communication network. This database can comprise data that have been measured by the terminal of the user for various mobility situations. It can also comprise data from other terminals belonging to the same user but also to other users performing the same reference gesture in different mobility situations. Thus, the database available on the network is enriched by different sources.

Figure 2:
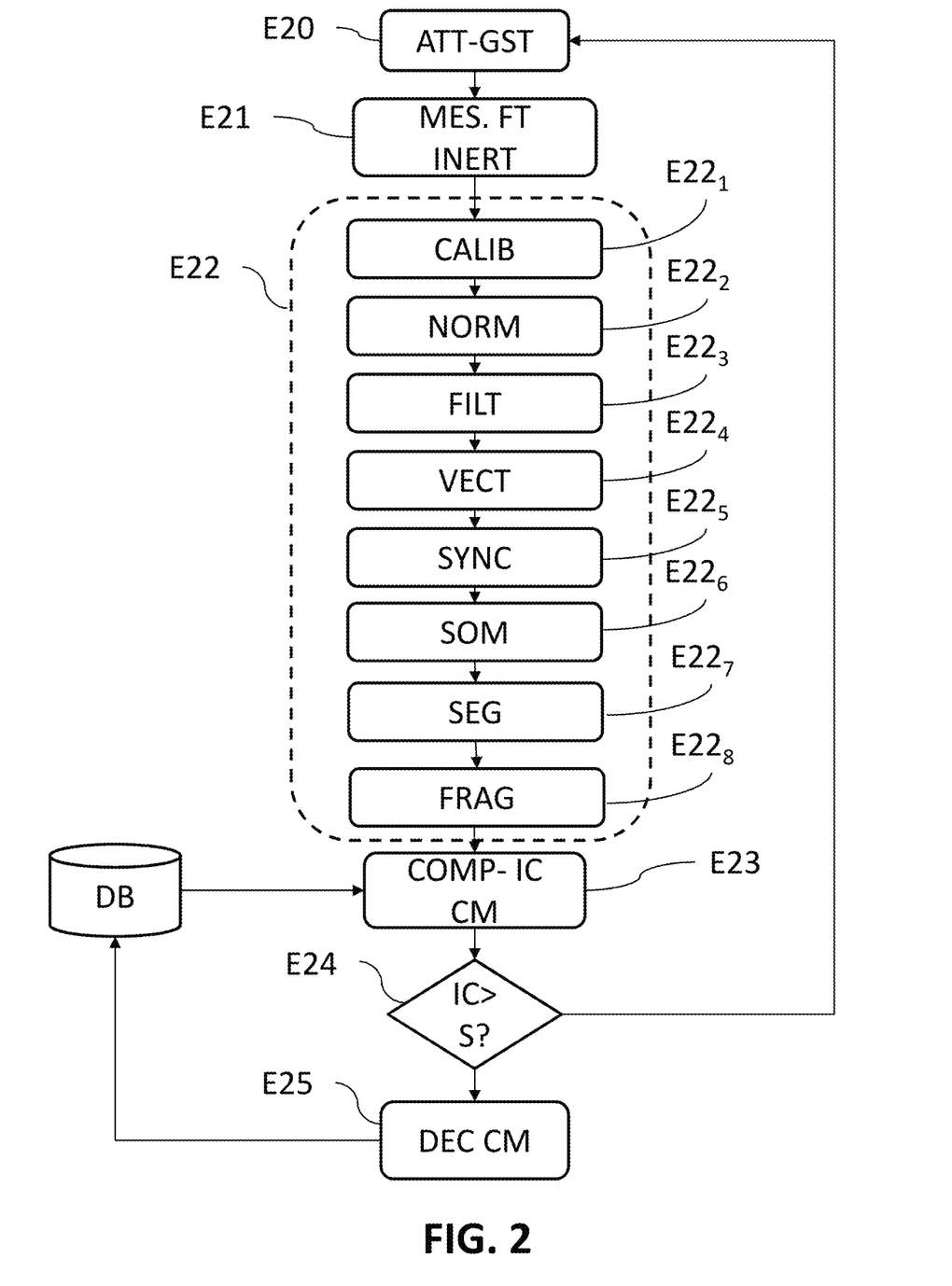
FIG. 2 illustrates, in the form of a flowchart, the steps of a method for determining a mobility context according to one embodiment of the disclosure.

However, in another embodiment, this database is integrated in the device 100. In this case, the method implemented and described in detail with reference to FIG. 2 is executed on the device without there being any need for communication to the network. The data recorded in the database are therefore those of the device for the defined reference gesture, which is performed on this device and in different mobility situations.

Thus, with reference to FIG. 2, the steps of a method for determining a mobility context according to one embodiment of the disclosure are now described. This method can be executed on the device itself or by a server of a communication network.

In step E20, the device 100 is on active standby and awaits the execution of a reference gesture with the device. The mobility context CM is initialized to a default mobility context, in the example here to the value "not moving".

When the user performs his reference gesture, such as, by way of example, the 3D infinity symbol, device in hand, a set of inertial sensors of the device gives measurements at E21, which are taken during an analysis time window that can be defined with a different length according to the precision that is to be provided for the analysis. In one exemplary embodiment, this time window is 500 ms. The time window is also defined according to data prerecorded in the database DB for the same reference gesture and for different mobility contexts in a learning phase, for example.

The set of inertial sensors can comprise one or more inertial sensors, for example an accelerometer, a gyrometer or a magnetometer.

Thus, the terminal obtains acceleration data along 3 axes from the accelerometer, angular velocity data representing rotations undergone by the terminal along 3 axes via the gyrometer, and data from the magnetometer that is suited to determining the orientation of the terminal in relation to a magnetic field, and in particular in relation to the earth's magnetic field.

The measurements of three inertial sensors are described in this case. The measurements of a single inertial sensor may be sufficient to implement the disclosure, however.

There may be provision for a step E22 of processing of the inertial data from these sensors. Thus, a step $E22_1$ performs calibration of the information captured by the sensors. The calibration can be carried out by correcting the measurements obtained by the sensors using a deviation value in relation to an invariable reference datum common to other terminals. By way of example, the deviation value can be calculated from a difference between a reference value and the values obtained by the sensors when the terminal is in a rest position. This calibration step may be useful when the data recorded in the database originate from different terminals. Specifically, depending on the terminals, the sensors vary in terms of precision, in terms of sampling frequency, etc.

A normalization step $E22_2$ is implemented by changing value scale in order to bring back the values of the signals to an interval [0; 1].

In order to reduce the noise that can perturb the data and make the characteristics of the data stand out for the 5 defined mobility contexts, signal processing techniques can be applied. Thus, at $E22_3$, low pass filtering is performed in order to filter out high frequencies and eliminate this source of noise from the data.

At $E22_4$, a vectorization step for the signals is performed. This step is used to simplify the captured signals by eliminating signal samples captured by a sensor that are not characteristic of the signals. If one allows oneself a local error of 0.1, for example, this means that if two samples are at a Euclidian distance of less than 0.1 then the second sample can be removed without affecting the information provided. An example of such an approximation method is described in the article entitled "On the Approximation Of Curves By Line Segments Using Dynamic Programming-II" published in February 1962 by Richard Bellman and Bella Kotkin as part of "United States Air Force Project Rand".

A step $E22_5$ performs synchronization of the information from the various inertial sensors. In one exemplary embodiment, the synchronization can be carried out by resampling the data sensor by sensor. The data from the sensors are, for example, sampled at a frequency that is sufficiently high for the set of data to be representative of the line, but sufficiently low for these data to be able to be processed by a mobile terminal. By way of example, a sampling frequency of 100 hertz makes it possible to obtain a satisfactory resolution for the signal without, however, producing an excessively large quantity of data.

A step $E22_6$ carries out fusion for the signals by means of concatenation or by computing a mean of the synchronized data. These data are, for example, concatenated sample by sample. By way of example, if {acc_x(t), acc_y(t), acc_z(t)} are the values from the acceleration sensor, {gyro_x(t), gyro_y(t), gyro_z(t)} are the values from the angular velocity gyrometer sensor and {mag_x(t), mag_y(t), mag_z(t)} are the values of the magnetic field that are measured by a magnetic field sensor, then the result of the is fusion is a 9-dimensional vector denoted {acc_x(t), acc_y(t), acc_z(t), gyro_x(t), gyro_y(t), gyro_z(t), mag_x(t), mag_y(t), mag_z(t)}, that is to say that for each time period, the method considers a 9-dimensional vector. Thus, the values from the various sensors are grouped so as to be taken into consideration in a dependent rather than in an independent manner.

Temporal segmentation is performed at $E22_7$ so as to remove the samples corresponding to the start and ends of a gesture that are not significant. In one implementation example, the effective power of the signals is computed as follows: $P=(x^2+y^2+z^2)^2$, x, y, z being the 3 measurement axes. A threshold is then defined to mark the start and end of a meaningful time segment. If the effective power is below this threshold, the signal does not have a lot of energy, which shows that there is also no prominent information. When the value is above the threshold, the information characterized by the signal is therefore characteristic.

Finally, fragmentation of the signals is performed at $E22_8$, where subdivision of the signals into fragments of the same size is performed by using, if necessary, a resampling technique. In one implementation example, the signal is fragmented into 5 segments. Quite obviously, another number of segments can be chosen according to the precision that is desired.

For a 500 ms signal, it can thus be fragmented into segments of 100 ms. This makes it possible to obtain decomposition of the reference gesture and therefore greater precision when this segment is compared with other segments prerecorded in the database. Specifically, the fragmentation or segmentation of the gesture makes it possible to compare more precise portions of the measurements of this gesture segment and with measurements of the same gesture portion in the database.

After these 5 signal fragments are obtained, they are compared at E23 with signals prerecorded in a learning database DB that has 5 categories of data according to the 5 degrees of mobility context and for a reference gesture. These data have been recorded, for example during a configuration phase where the reference gesture has been performed for the 5 different mobility contexts and then in step with the context recognitions performed.

In this comparison step, the most probable mobility context is determined and a confidence index IC for this determination is defined.

In one exemplary embodiment, this step is performed by supervised neural network classification such as the MLP ("Multi-Layer Perceptron") method, for example. This method outputs a value between 0 and 1 for each mobility context. The maximum value corresponds to the most probable context and provides a confidence index about the decision. By way of example, if this confidence index is higher than 0.95, this means that confidence about the chosen context is very high, whereas if the confidence index is 0.20, confidence about the chosen context is very low.

In one particular embodiment, step E23 is performed by a method based on Siamese networks SNN ("Siamese Neural Network"). An example of such a method is described in the document entitled "Signature Verification using a "Siamese" Time Delay Neural Network" by the authors Jane Bromley, Isabelle Guyon, Yann LeCun, Eduard Sackinger and Roopak Shah in NIPS Proc, 1994.

These networks attempt to use a learning process to model the similarity between gestures/actions/activities in one and the same class (in this case a whole series of reference gestures describing a context, for example "extreme movement") and the dissimilarities with other classes (in this case context classes).

According to the cited document by Bromley et al., neural learning is performed using the gradient descent algorithm attempting to minimize the following objective function:

$$E_W(X1,X2,Y)=(tX1X2(Y)-\cos(O_{X1},O_{X2}))^2,$$

where X1 and X2 are two examples to be learned and Y is the resemblance label (tX1X2(Y)=1 for similarity and −1 for dissimilarity), $O_{X1}$ and $O_{X2}$ are the outputs of the Siamese network for the examples X1 and X2.

Once SNN learning has finished, the output vector $O_X$ for a test input X is a characteristic vector that can be compared with the outputs $O_{X1}, O_{Xn}$ of all learning examples in order to determine the class of X as being that of the learning example closest to the meaning of a cosine distance.

This method assumes that the input vectors of the network SNN are of fixed size. We choose to fragment the reference gesture information to be learned by context class (for example 100 ms). Let us assume that the gesture produced at $E22_8$ is 500 ms, then we have 5 time segments. In a learning phase, we will therefore have 5×5 classes to be modeled: the 1st segment of the "not moving" class, the 2nd segment of the "not moving" class, etc. up until the 5th segment of the "extreme movement" class.

In a test phase, a comparison (within the meaning of the cosine distance and the k plus closest neighbors) of the SNN outputs of the 5 test segments with the respective outputs of the learning segments of the mobility contexts is performed. Each segment is labeled with the name of a winning class. The test gesture is then classified by majority vote about these 5 segments. The information about the votes is kept as a confidence measurement (i.e. 3 votes for the "not moving" class correspond to a confidence measurement or confidence index of ⅗).

At E24, if the characteristic segments are not recognized (that is to say that the confidence index obtained doesn't exceed a fixed threshold), the system is informed of this and keeps its mobility context status unchanged. If one or more characteristic segments are recognized (the highest confidence measurement of the classifier is sufficient according to the predefined threshold and is in keeping with the history of the previously recognized contexts), the status of the mobility context is identified at E25 and recorded.

In one possible implementation example, so that the user does not have to make his reference gesture several times, a threshold of the order of 0.7 can be chosen. Depending on the intended applications, this value can be increased or reduced according to the desired precision.

This mobility context CM will be able to be used for adapting services on the terminal, for example. Specifically, depending on whether the user is in an "extreme movement" or "not moving" mobility context, he will not be able to perform the same actions on his terminal. By way of example, the interface will be able to be adapted to receive information by voice if the context is "extreme movement" rather than by text if the context is "not moving".

This context information feeds the database DB, which comprises a knowledge base for archiving the history of contexts, at E25. This history makes it possible to promote mobility context situations in which the user finds himself most often. The database DB is thus fed by learning the reference gesture according to different mobility contexts. Following the determination of the mobility context at E25, the knowledge base DB is fed by the inertial measurements obtained for this determined mobility context. This therefore makes it possible to enrich the knowledge base DB in step with the reference gestures performed.

This mobility context information is obtained prior to any gesture action performed on the terminal and in the same context. The user therefore firstly makes the reference gesture in order to implement the method according to an embodiment of the disclosure. As the mobility context is then determined, the user can perform a gesture trigging a predetermined action, for example. If he shakes his phone, for example, this plays music in a random manner. Detection of this movement is then performed taking into account the determined mobility context. The measurements taken by the sensors are then corrected as a result in order to take into account the mobility context so that detection of the shaking gesture is interpreted correctly.

The mobility context information can also be used in order to adapt the interface of the terminal to the mobility context as mentioned above, the interaction of the user being able to be different.

Figure 3:
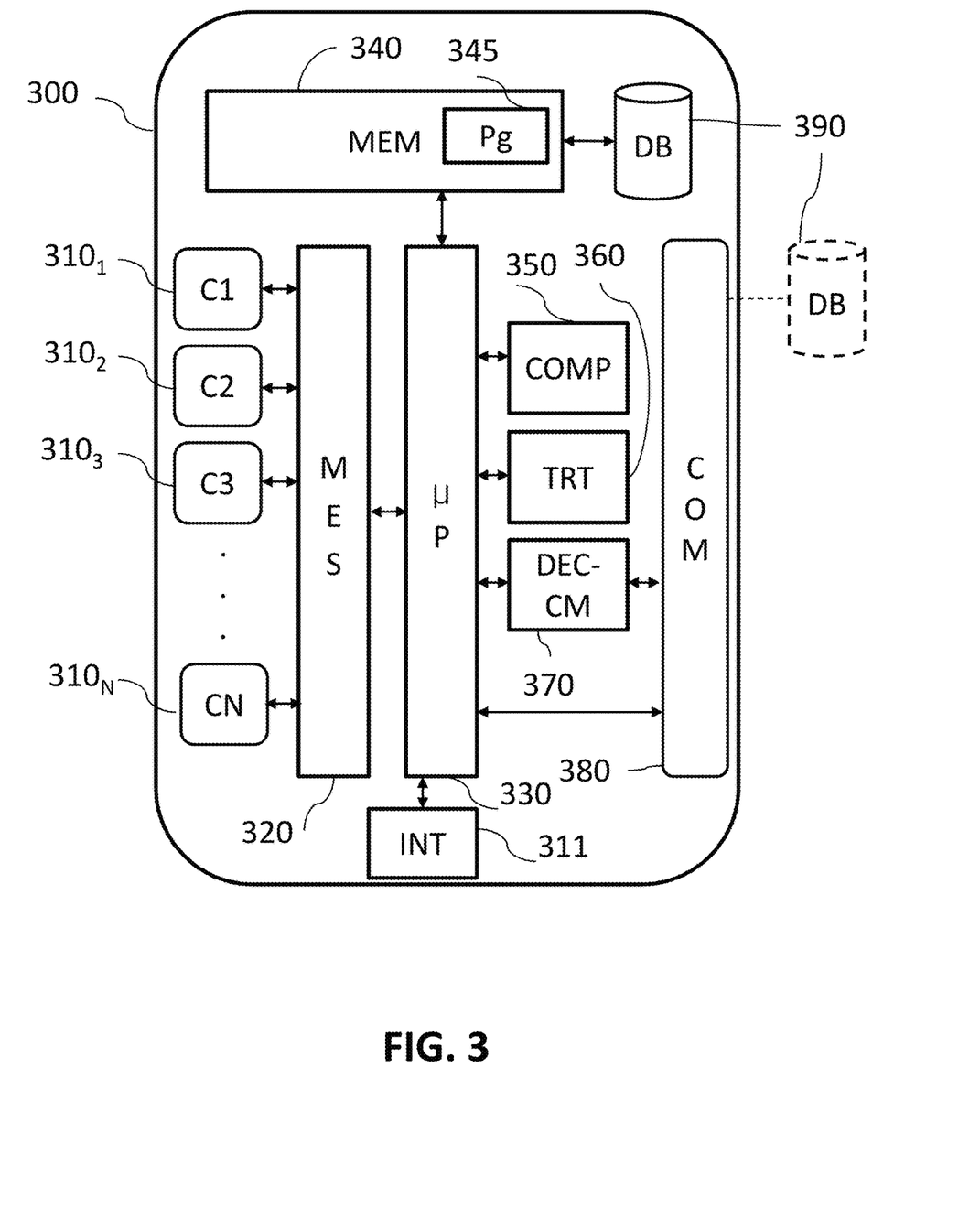
FIG. 3 illustrates a hardware representation of a device implementing the disclosure, in one embodiment.

With reference to FIG. 3, a simplified structure of a device 300 capable of implementing the method for determining a mobility context as described with reference to FIG. 2 will now be considered.

It will be noted that embodiments of the disclosure described here can be implemented by means of software and/or hardware components. With this in mind, the terms "module" and "entity" used in this document can correspond either to a software component or to a hardware component, or else to a set of hardware and/or software components, which are capable of implementing the function(s) described for the module or entity in question. This device is equipped with a module for collecting measurements 320 that is capable of collecting the measurements of inertial data captured by the sensors C1 to CN represented in this case at $310_1$, $310_2$, $310_3$ and $310_N$.

By way of example, sensors of accelerometer type are provided and are capable of measuring the linear acceleration of the device along 3 orthogonal axes. A sensor of gyroscope or gyrometer type can also be provided and is capable of measuring angular velocity data representative of rotations undergone by the device along 3 axes, and a sensor of magnetometer type is capable of determining the orientation of the device in relation to a magnetic field, and in particular in relation to the earth's magnetic field.

Moreover, the device is fitted with an interface 311 that may be a touch interface and that is capable of detecting graphical gestures on this interface.

The device comprises a processing unit 330 equipped with a processor and controlled by a computer program Pg 345 stored in a memory 340 and implementing the method for determining a mobility context according to an embodiment of the disclosure.

On initialization, the code instructions of the computer program Pg are loaded into a RAM memory, for example, which is not shown, and are executed by the processor of the processing unit 330. The processor of the processing unit 330 implements the steps of the method for determining a mobility context described above, according to the instructions of the computer program Pg.

In the exemplary embodiment of the disclosure under consideration, the device 300 therefore comprises a module 320 for collecting measurements of inertial data from the inertial sensors of the device that are taken at the time of execution of a reference gesture with the device. It comprises a module 350 for comparing the measured inertial data with inertial data prerecorded for various mobility contexts and for this reference gesture, and a decision module 370 for determining the mobility context according to the result of the comparison. In one embodiment, the device also comprises a signal processing module 360 capable of performing the various processing operations on inertial data, such as those processing operations described with reference to steps $E22_1$ to $E22_8$ of FIG. 2.

In one embodiment, the device comprises a database DB 390 comprising a knowledge base of inertial data recorded by learning for various mobility contexts and for the reference gesture. Following the determination of a mobility context according to an embodiment of the disclosure, this database is enriched by inertial data corresponding to this determined mobility context.

In another embodiment, this database is stored on a remote server accessible by a communication network via a communication module 380 of the device. The communication network is an IP network, for example.

The device thus described is a mobile terminal of smartphone type, an electronic tablet, an electronic diary, a watch, a bracelet or any type of electronic device having inertial sensors, for example.

Figure 4:
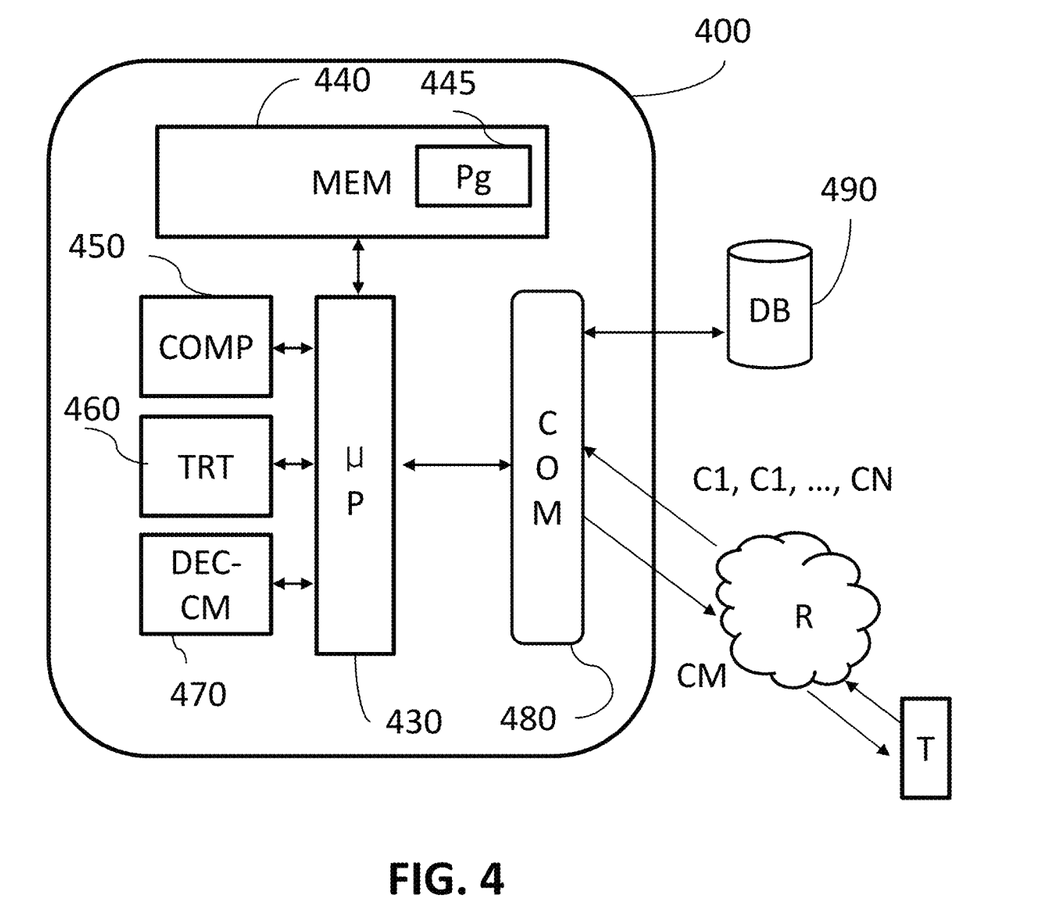
FIG. 4 illustrates a hardware representation of an apparatus or server implementing the disclosure, in one embodiment.

With reference to FIG. 4, a simplified structure of an apparatus or server 400 capable of implementing the method for determining a mobility context as described with reference to FIG. 2 will now be considered.

The server comprises a processing unit 430 equipped with a processor and controlled by a computer program Pg 445 stored in a memory 440 and implementing the method for determining a mobility context according to an embodiment of the disclosure.

On initialization, the code instructions of the computer program Pg are loaded into a RAM memory, for example, which is not shown, and are executed by the processor of the processing unit 430. The processor of the processing unit 430 implements the steps of the method for determining a mobility context described above, according to the instructions of the computer program Pg.

In the exemplary embodiment of the disclosure under consideration, the server 400 comprises a module 480 for receiving inertial data from the inertial sensors situated on a device that are taken at the time of execution of a reference gesture with the device. This reception module is in this case illustrated by a communication module that receives these sensor data transmitted by the device T via a communication network R.

The server also comprises a module 450 for comparing the measured inertial data received with inertial data prerecorded for various mobility contexts and for this reference gesture, and a decision module 470 for determining the mobility context according to the result of the comparison.

In one embodiment, the server also comprises a signal processing module 460 capable of performing the various processing operations on inertial data, such as those processing operations described with reference to steps $E22_1$ to $E22_8$ of FIG. 2.

In one embodiment, the server comprises a database DB 490 comprising a knowledge base of inertial data recorded by learning for various mobility contexts and for the reference gesture. After the determination of a mobility context according to an embodiment of the disclosure, this database is enriched by the inertial data corresponding to this determined mobility context.

In another embodiment, this database is stored on another remote server accessible by a communication network via the communication module 480 of the server. The communication network is an IP network, for example.

This communication module transmits the mobility context determined by the implemented method to the device T from which the execution of the reference gesture originates.

This type of apparatus 400 may be a server of a communication network or else a communication terminal that receives data from sensors of a smart apparatus T, for example a watch or a bracelet, via a wireless network R, for example of Bluetooth or Wifi type.

In one implementation example, an experimental protocol is now described to implement the determination of a mobility context of a user carrying a phone fitted with inertial sensors.

In this example, we will use the data of an InvenSense® MPU-6500 accelerometer/gyrometer module. The accelerometer data vary between −2 g and 2 g and the gyrometric data vary between −1000 and +1000°/sec with a mean sampling period of 30 ms.

In this example, we will consider five mobility contexts: sitting, walking, running, climbing stairs, coming down stairs. The reference gesture is in this case the symbolic gesture "alpha".

In order to put together a representative panel of data, a person carries out 40 instances of the reference gesture in the 5 mobility contexts. Thus, 20 key gesture instances of one and the same mobility context are chosen at random from among the 40 available instances in order to put together a base referred to as a learning base and 20 other instances make up examples for a test base. In this example, we therefore have 100 gesture instances for learning the 5 mobility contexts and 100 gesture instances to be classified. In the example described here, 10 experiments are carried out implementing the method according to an embodiment of the disclosure in order to carry out cross-validation (i.e. evaluation via the mean rate of good recognition and via the best recognition rate).

An experiment corresponds to 20 gesture instances to be classified.

According to the implementation described, all data for the gesture instances are processed by step E22 described with reference to FIG. 2.

Let $i \in \{0, \ldots, 1\}$ be the number of gesture instances to be processed. Step E22 comprises a phase of calibration $E22_1$ of the input signals $Ai(t)$ for the accelerometer and $Gi(t)$ for the gyrometer. Let $t \in \{0, \ldots, T\}$ be the time index for the signal $Ai(t)$ and $t' \in \{0, \ldots, T'\}$ be the time index for the signal $Gi(t')$.

We can apply the following equation in order to obtain the calibrated signal $Ai_c(t)$ and $Gi_c(t')$:

$$Ai_c(x,t) = (Ai(x,t)-A)*1000/B;$$

$$Ai_c(y,t) = (Ai(y,t)-C)*1000/D;$$

$$Ai_c(z,t) = (Ai(z,t)-E)*1000/F;$$

$$Gi_c(x,t') = (Gi(x,t')-A')*1000/B';$$

$$Gi_c(y,t') = (Gi(y,t')-C')*1000/D';$$

$$Gi_c(z,t') = (Gi(z,t')-E')*1000/F';$$

where A, B, C, D, E, F, A', B', C', D', E' and F' are real calibration values.

Step E22 comprises a phase $E22_2$ of normalization of the signals $Ai_c(t)$ and $Gi_c(t')$ to give the normalized signals $Ai_n(t)$ and $Gi_n(t')$ according to the equation:

$$Ai_n(t) = (Ai_c(t) - \min_t(Ai_c(t)))/(\max_t(Ai_c(t)) - \min_t(Ai_c(t)));$$

$$Gi_n(t') = (Gi_c(t') - \min_{t'}(Gi_c(t')))/(\max_{t'}(Gi_c(t')) - \min_{t'}(Gi_c(t'))).$$

Step E22 also comprises a filtering phase $E22_3$ to give the filtered signals $Ai_f(t)$ and $Gi_f(t')$ according to the equation:

$$Ai_f(t) = Ai_n(t)*H + Ai_n(t-1)*(1-H); \text{ where } H \text{ is a real value.}$$

$$Gi_f(t') = Gi_n(t')*H' + Gi_n(t'-1)*(1-H'); \text{ where } H' \text{ is a real value.}$$

Step E22 comprises a vectorization phase $E22_4$ to create the signals $Ai_v(t)$ and $Gi_v(t')$ according to the equation:

If $|Ai_f(t) - Ai_f(t+1)| < 0.11$ then $Ai_v(t) = Ai_f(t+1)$

If $|Gi_f(t') - Gi_f(t'+1)| < 0.11$ then $Gi_v(t') = Gi_f(t'+1)$

Step E22 comprises a synchronization phase $E22_5$ for the calibrated signals $Ai_v(t)$ and $Gi_v(t')$. Let $k \in \{0, \ldots, K\}$ be the time index for the new synchronized signals $Ai_s(k)$ and $Gi_s(k)$. We look for the missing values according to the equation:

$$Ai_s(k) = Ai_c(t) + (k-t)(Ai_c(t+1) - Ai_c(t));$$

$$Gi_s(k) = Gi_c(t') + (k-t')(Gi_c(t'+1) - Gi_c(t')).$$

A step $E22_6$ carries out fusion of the signals $Ai_s(k)$ and $Gi_s(k)$ to give the signal $Xi(k)$ in 6 dimensions through a concatenation of the values x,y,z from each sensor over time k. The components of $Xi(k)$ are then $c_1, c_2, c_3, c_4, c_5, c_6$ over the course of time k.

Step E22 comprises a phase $E22_7$ of segmentation of the signal start and end according to the equation:

$$Xi_s(k) = Xi(k) \text{ if } P > Z;$$

$$P = Xi(c1,k)^2 + Xi(c2,k)^2 + Xi(c3,k)^2 + Xi(c4,k)^2 + Xi(c5,k)^2 + Xi(c6,k)^2$$

where Z is a real value.

Figure 5:
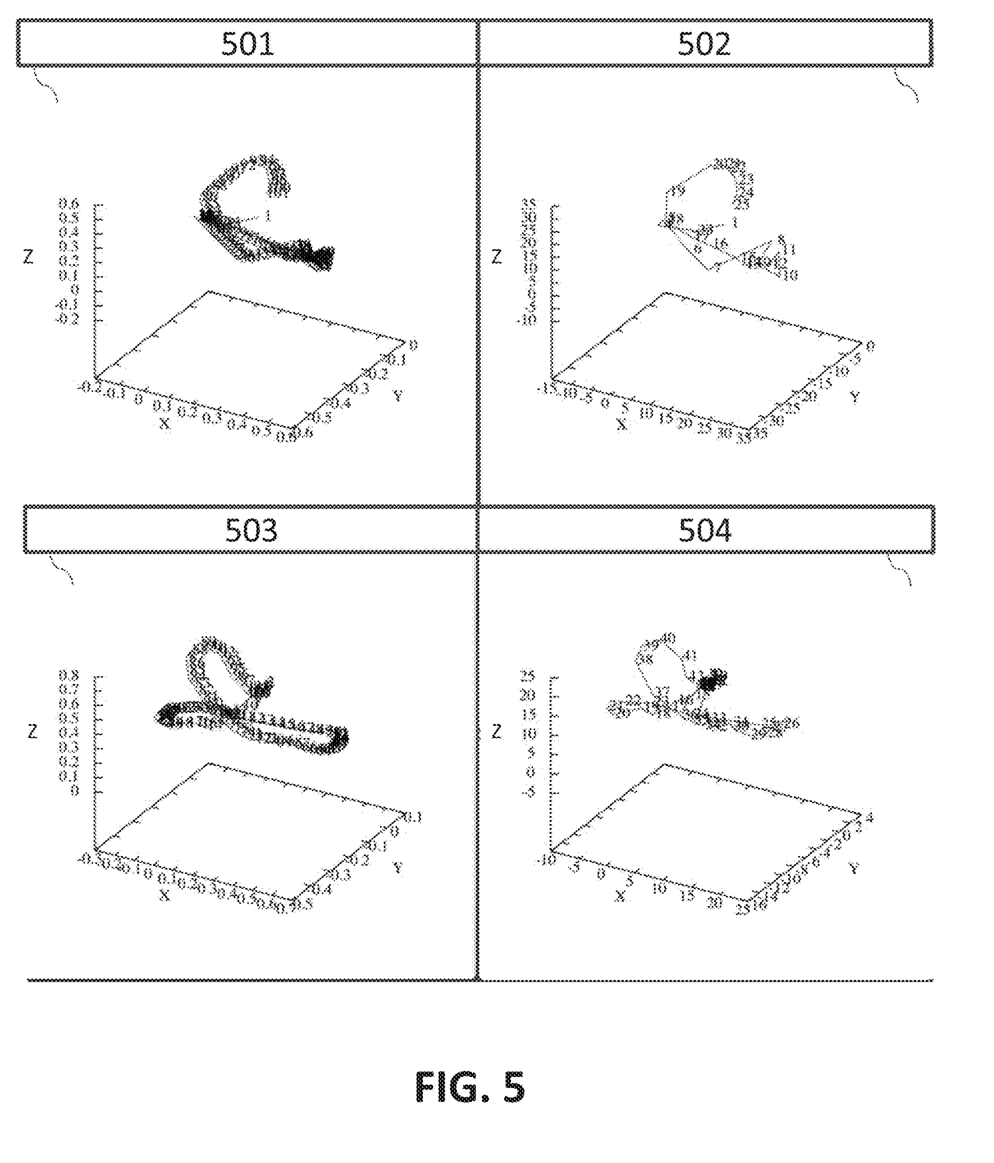
FIG. 5 illustrates successions of points in space, before and after processing, at the time of the execution of a reference gesture for two different mobility contexts.

FIG. 5 illustrates a visualization of an alpha gesture instance before and after processing for two different mobility contexts. Thus, the illustration 501 represents the succession of points in space at the time of the alpha gesture instance in a context where the user is running. The illustration 502 represents this same gesture instance after the processing steps cited above.

Likewise, the illustration 503 represents the succession of points in space at the time of the alpha gesture instance in a context where the user is sitting. The illustration 504 represents this same gesture instance after the processing steps cited above.

To learn the fragments of reference gestures describing the mobility contexts, derived from a step of fragmentation $E22_8$ into fragments of equal length, a Siamese neural network is set up. This network is made up of a layer of input neurons (601), a layer of hidden neurons (602) and a layer of output neurons (603) illustrated in FIG. 6. We are choosing a 150;45;80 architecture (the number of input, hidden and output neurons respectively). The learning of the neurons of the Siamese network is effected through iteration or number of periods. In one implementation example, this number is 400. These iterations take place according to the "backpropagation" method or descent of the gradient (the learning rate is fixed at 0.0005) of an objective function.

Figure 6:
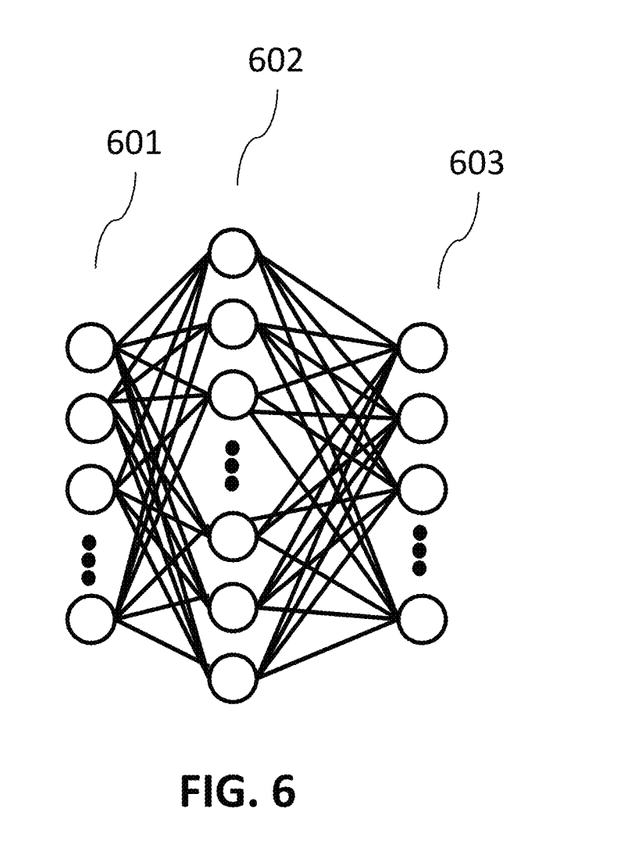
FIG. 6 illustrates a representation of a neural network used in one embodiment of the disclosure.

In this case, the objective function is:

$$E_W(X1,X2,Y) = (tX1X2(Y) - \cos(O_{X1}, O_{X2}))^2,$$

where X1 and X2 are two examples to be learned and Y is the resemblance label (tX1X2 (Y)=1 for similarity 1 and −1 for dissimilarity), $O_{X1}$ and $O_{X2}$ are the outputs of is the Siamese network for the examples X1 and X2.

The network learns, on the learning bases, the similarity of each fragment to its equivalent (i.e. fragment with the same index) for the same context and the dissimilarity of this fragment from the fragments with the same index for all other contexts.

Once learning has finished, the reference gesture instances are classified as follows. The test instance is processed by step E22, and is subdivided into 5 fragments. Each fragment is used at the input of the Siamese network with an example of a learning fragment with the same index for each class. An approach of "closest neighbor" type is set up to determine the closest context for this fragment and an approach of "majority vote" type ascertains the final decision for the 5 fragments.

Figure 7:
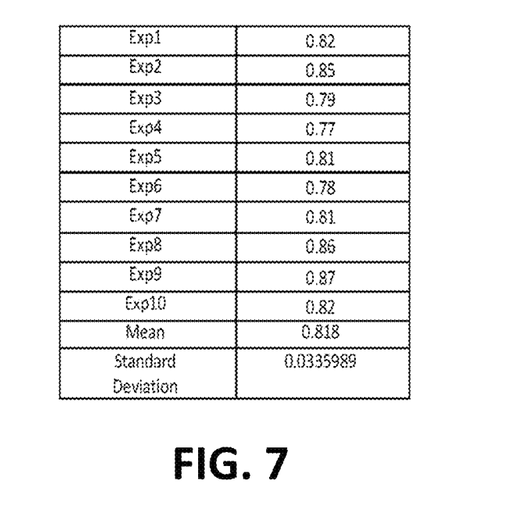
FIG. 7 represents a table of values giving the results of reference gesture classification rates for 10 experiments of the method according to the disclosure.

The table of FIG. 7 shows the results with the classification rates for the 10 experiments. We thus obtain 81.80% good mean classifications for this experimental protocol with a reduced standard deviation of 3.36%.

An exemplary embodiment of the present application improves the situation discussed above with respect to the prior art.

Although the present disclosure has been described with reference to one or more examples, workers skilled in the art will recognize that changes may be made in form and detail without departing from the scope of the disclosure and/or the appended claims.

The invention claimed is:

1. A method for determining a mobility context for a user carrying a device fitted with inertial sensors, wherein the method comprises the following acts performed by the device or an apparatus in communication with the device:
    measuring inertial data from a set of the inertial sensors of the device, taken at the time of execution of a reference gesture in which the device is moved in a three-dimensional interaction space;
    determining a most probable mobility context by a neural learning process according to similarities detected on comparing the measured inertial data with prerecorded inertial data for various mobility contexts and for the reference gesture; and
    according to the determined most probable mobility context, adapting services on the device by adapting an interface of the device so that interaction of the user on the interface is adapted to the determined most probable mobility context, and/or by correcting further measurements taken by the sensors.

2. The method according to claim 1, wherein the determination of the mobility context comprises determining a degree of mobility.

3. The method according to claim 2, wherein a fragmentation is applied to the measured inertial data in order to obtain a plurality of signals corresponding to various degrees of mobility to be detected.

4. The method according to claim 1, wherein the act of determining the most probable mobility context is associated with a confidence index on the determined mobility context.

5. The method according to claim 1, wherein the prerecorded inertial data are in a knowledge base fed by learning the reference gesture depending on various mobility contexts and wherein following the determination of the mobility context, the knowledge base is fed by the inertial measurements obtained for this determined mobility context.

6. The method according to claim 1, wherein adapting services on the device comprises adapting an interface of the device so that interaction of the user on the interface is adapted to the determined most probable mobility context.

7. The method according to claim 1, wherein adapting services on the device comprises correcting further sensors measurements of the device.

8. A device that is capable of determining a mobility context for a user carrying the device, wherein the device comprises:
    inertial sensors;
    a non-transitory computer-readable medium comprising instructions stored thereon;
    a processor configured by the instructions to perform acts comprising:
    measuring inertial data from a set of the inertial sensors of the device, taken at the time of execution of a reference gesture in which the device is moved in a three-dimensional interaction space;
    determining a most probable mobility context according to similarities detected on comparing the measured inertial data with prerecorded inertial data for various mobility contexts and for the reference gesture; and
    adapting services on the device according to the determined most probable mobility context by adapting an interface of the device so that interaction of the user on the interface is adapted to the determined most probable mobility context, and/or by correcting further measurements taken by the sensors.

9. A terminal comprising the device according to claim 8.

10. An apparatus capable of determining a mobility context for a user carrying a device fitted with inertial sensors, wherein the apparatus comprises:
    a non-transitory computer-readable medium comprising instructions stored thereon;
    a processor configured by the instructions to perform acts comprising:
    receiving measurements of inertial data from a set of the inertial sensors of the device, taken at the time of execution of a reference gesture in which the device is moved in a three-dimensional interaction space;
    determining a most probable mobility context according to similarities detected on comparing the measured inertial data with prerecorded inertial data for various mobility contexts and for the reference gesture; and
    according to the determined most probable mobility context, adapting services on the device by adapting an interface of the device so that interaction of the user on the interface is adapted to the determined most probable mobility context, and/or by correcting further measurements taken by the sensors.

11. A non-transitory information storage medium that can be read by a processor, on which is recorded a computer program comprising instructions for executing acts of a method for determining a mobility context for a user carrying a device fitted with inertial sensors, wherein the instructions configure the processor to perform acts comprising:
    measuring inertial data from a set of the inertial sensors of the device, taken at the time of execution of a reference gesture in which the device is moved in a three-dimensional interaction space;
    determining a most probable mobility context according to similarities detected on comparing the measured inertial data with prerecorded inertial data for various mobility contexts and for the reference gesture; and
    according to the determined most probable mobility context, adapting services on the device by adapting an interface of the device so that interaction of the user on the interface is adapted to the determined most probable mobility context, and/or by correcting further measurements taken by the sensors.

* * * * *